2 Sheets—Sheet 1.
D. N. MELVIN.
FURNACES FOR GENERATING STEAM.
No. 7,258. Reissued Aug. 8, 1876.
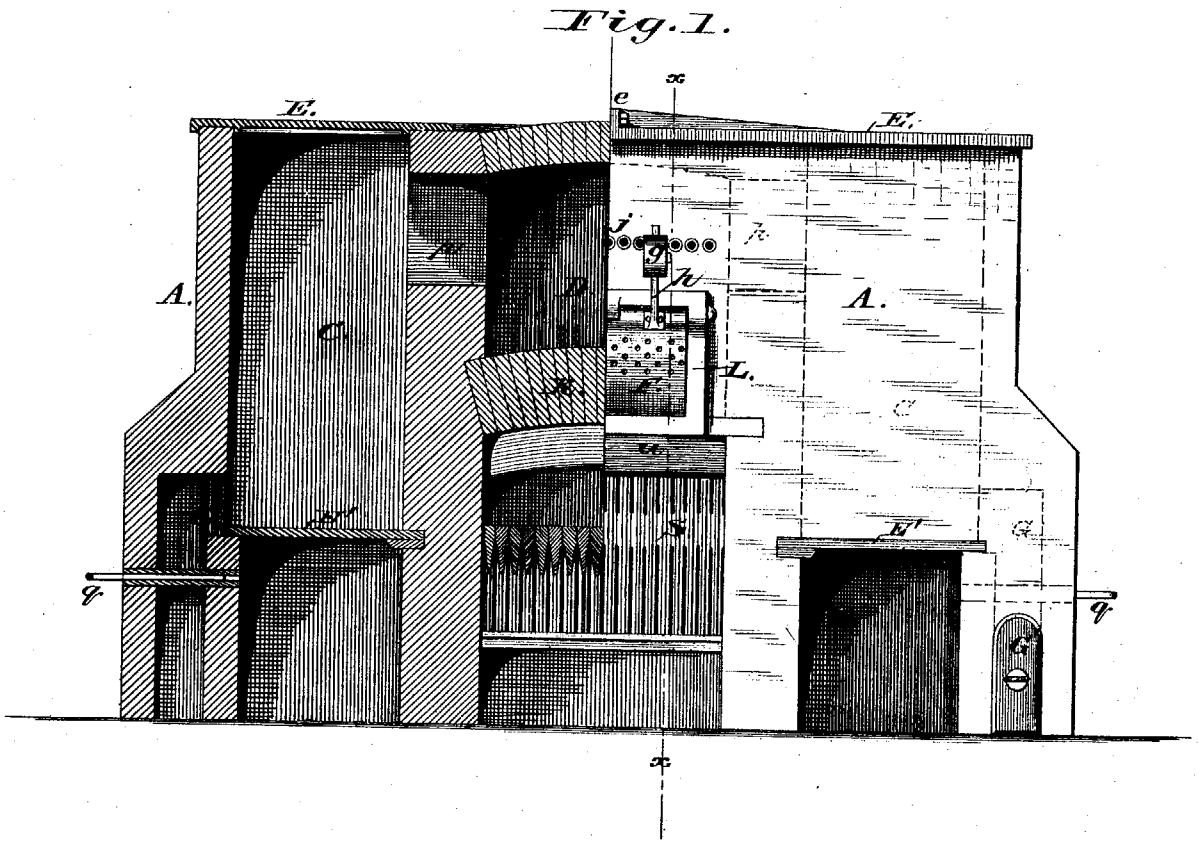
Attest:
John B. Pearson
Arnold F. Yarker.
Inventor.
David N. Melvin
N. PETERS, PHOTO-LITHOGRAPHER, WASHINGTON, D. C.

2 Sheets—Sheet 2.

D. N. MELVIN.

FURNACES FOR GENERATING STEAM.

No. 7,258. Reissued Aug. 8, 1876.

Attest:
John B. Pearson
Arnold, F. Parker.

Inventor:
David N. Melvin

N. PETERS, PHOTO-LITHOGRAPHER, WASHINGTON, D. C.

UNITED STATES PATENT OFFICE.

DAVID N. MELVIN, OF LINOLEUMVILLE, NEW YORK, ASSIGNOR, BY MESNE ASSIGNMENTS, TO H. LANSING PERRINE AND ANDREW C. BRADLEY.

IMPROVEMENT IN FURNACES FOR GENERATING STEAM.

Specification forming part of Letters Patent No. 75,039, dated March 3, 1868; reissue No. 7,258, dated August 8, 1876; application filed July 24, 1876.

DIVISION A.

*To all whom it may concern:*

Be it known that I, DAVID NEILSON MELVIN, of Linoleumville, Richmond county, State of New York, formerly of Birmingham, England, have invented new and useful Improvements in Furnaces, of which the following is a full and exact description, reference being had to the accompanying drawings, forming part of this specification, in which—

Figure 3:
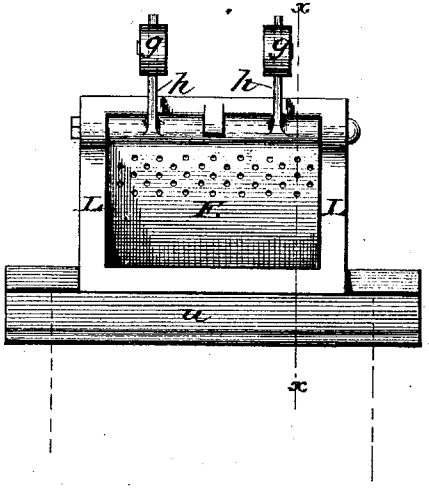
Figure 2:
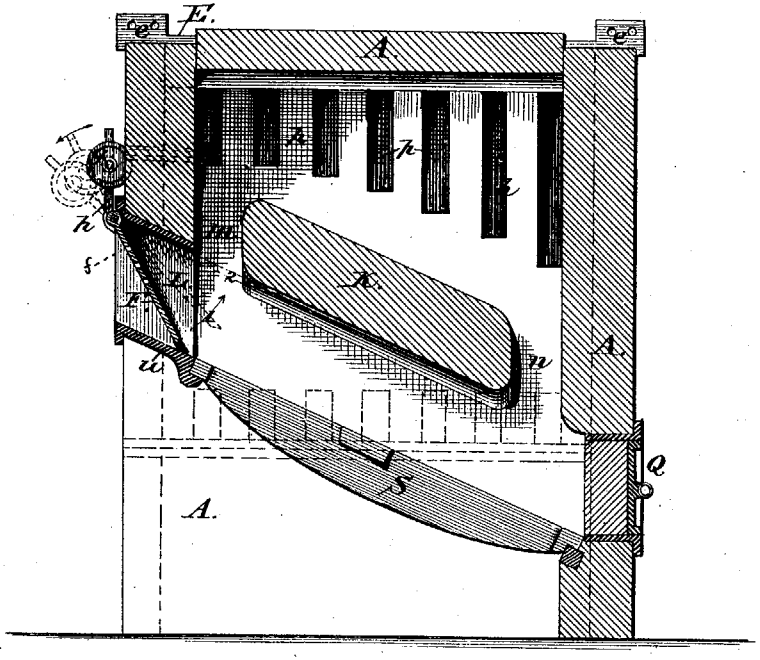

Figure 1 is a front elevation of this invention, partly in section. Fig. 2 is a vertical transverse section of the same in the plane of the line *x x* of Fig. 1. Fig. 3 is a front elevation of the furnace-door detached.

This invention relates more particularly to furnaces for steam-generators, although some of its features are applicable to other classes of furnaces; and its object is to effect the thorough combustion of the fuel and the gases generated therefrom, and economize in consumption. It consists in an inclined fire-grate, a like inclined fire arch or bridge arranged over the grate, forming a flue between it and the front wall of the furnace, and a similar flue with the rear wall, communicating with an upper combustion-chamber; and in a furnace-door horizontally hung, swinging open and shut at its base, and provided with a counterbalancing-weight; and in a downwardly-inclined bed-plate or sill, against which said door closes, all as hereinafter more fully described and claimed.

In Fig. 1 the furnace proper is represented located in the center of the figure, with heating-chambers C C on either side, in which are placed the boiler-tubes, constituting the subject of a separate application. S is the inclined grate, the slope of which descends from the door to the rear of the furnace, at an angle of inclination, preferably, of about twenty-five degrees. The grate-bars are formed with shoulders about their center, which serve as supports to the bars. The length and location of these shoulders may be varied according to circumstances and the character of the fuel used. K is an arch or bridge extending across the furnace-chamber over the grate, and at about the same angle of inclination. It forms a partial diaphragm and flues, *m* and *n*, respectively, with the front and rear walls. These flues communicate with, and conduct the gases, &c., to, the combustion-chamber D immediately above. The combustion-chamber D communicates with the heating-chambers C C through the flues *p p*. The door-frame L is cast with an inclined sill or bed-plate, *u*, against which the door swings in closing. It is of about the same angle of inclination as the grate, extends across the fire-box, supports the upper ends of the grate-bars, serves as a partial guide or chute for the introduction of fuel, and, when the door is partially open, acts as a deflector to the fresh air thereby admitted, and causes it to mingle with the gases as they are evolved. The door F is hung upon a horizontal axis supported in the upper part of the frame L, and opens and closes at its bottom, instead of at one side, as is the case with the ordinary door. It is furnished with a series of perforations, *f*, for the purpose of admitting air in aid of combustion, and is provided with counterbalancing-weights *g*, secured upon arms *h*, so as to swing clear of the frame when the door is opened and closed. It opens inwardly. The weights or counterpoise are so adapted and adjusted as to balance the door upon its axis, and render it self-sustaining in any position in which it may be set.

Among the advantages of this peculiarly constructed and operated door are, first, that it can be readily opened and closed for the admission of fuel; second, the fire can be raked by merely opening the door sufficiently far to admit the slice-bar, thus avoiding the necessity of admitting a large volume of cold air within the furnace, and upon the fuel, during the operation of raking; and, third, that, being counterbalanced and self-sustaining, it can be set partially open, so as to admit sufficient air to mingle with and aid the combustion of the evolved gases, and thereby save a large percentage in the consumption of fuel. Owing to the peculiar inclination of the grate-bars, and the location of the arch or bridge K, the inflammable and combustible gases are first evolved in the front and upper portion of the furnace, and pass up the flue *m* near the door, readily commingling with the cold air admitted through or under the door, thus rendering their combustion more perfect as they pass into the chamber D. The introduction of fresh fuel forces this carbonized coal down the grate under the bridge, and to the lower or rear end of the grate, where the resulting non-combustible gases pass up the flue *n*, and through the back flues *p* into the heating-chambers, the back flues *p* being made larger, inasmuch as the draft there is much less than it is in front.

This construction of furnace insures the most perfect combustion of gaseous products, and prevents the admixture therewith of the non-combustible gases.

I claim as my invention—

1. A furnace-door horizontally hung in its frame, so as to swing open and shut at its base, in combination with an inwardly-inclined bed-plate or sill, substantially as and for the purpose described.

2. The combination of a furnace-door horizontally hung, so as to swing open and shut at its base, with a counterbalancing-weight, for the purposes set forth.

3. The combination of a furnace-door horizontally hung, so as to swing open and shut at its base, with a counterbalancing-weight or counterpoise, and a downwardly-inclined bed-plate or sill, substantially as and for the purposes set forth.

4. A furnace having inclined grates and a similarly-inclined bridge or partial diaphragm, K, in combination with the flues *m n* and the combustion-chamber D, substantially as and for the purpose set forth.

DAVID N. MELVIN.

Witnesses:

JOHN B. PEARSON,

ARNOLD F. YARKER.